US009153232B2

(12) United States Patent
Zhang

(10) Patent No.: US 9,153,232 B2
(45) Date of Patent: Oct. 6, 2015

(54) VOICE CONTROL DEVICE AND VOICE CONTROL METHOD

(71) Applicant: VIA Technologies, Inc., New Taipei (TW)

(72) Inventor: Guo-Feng Zhang, Shanghai (CN)

(73) Assignee: VIA Technologies, Inc., New Taipei (TW)

( * ) Notice: Subject to any disclaimer, the term of this patent is extended or adjusted under 35 U.S.C. 154(b) by 359 days.

(21) Appl. No.: 13/736,972

(22) Filed: Jan. 9, 2013

(65) Prior Publication Data

US 2014/0149122 A1 May 29, 2014

(30) Foreign Application Priority Data

Nov. 27, 2012 (CN) .......................... 2012 1 0491178

(51) Int. Cl.
*G10L 25/00* (2013.01)
*G10L 15/22* (2006.01)
*G06F 1/32* (2006.01)
*G10L 15/28* (2013.01)

(52) U.S. Cl.
CPC .............. *G10L 15/22* (2013.01); *G06F 1/3203* (2013.01); *G06F 1/3231* (2013.01); *G10L 15/28* (2013.01); *G10L 2015/223* (2013.01); *Y02B 60/1289* (2013.01)

(58) Field of Classification Search
USPC .......................... 704/246, 247, 251, 252, 275
See application file for complete search history.

(56) References Cited

U.S. PATENT DOCUMENTS 5,983,186 A * 11/1999 Miyazawa et al. ............ 704/275
2002/0116196 A1* 8/2002 Tran ............................. 704/270
2010/0191525 A1* 7/2010 Rabenko et al. .............. 704/211
2013/0289994 A1* 10/2013 Newman et al. .............. 704/254

FOREIGN PATENT DOCUMENTS

CN 101483683 7/2009
CN 102404330 4/2012

* cited by examiner

*Primary Examiner* — Leonard Saint Cyr
(74) *Attorney, Agent, or Firm* — Jianq Chyun IP Office

(57) ABSTRACT

A voice control device and a corresponding voice control method are provided. The voice control device includes a sound receiver, a sound converter, a voice identifier, and a central processing unit (CPU). The sound receiver receives a first sound signal. The sound converter converts the first sound signal from analog signal to digital signal. The voice identifier identifies a first voice signal from the first sound signal, performs a first comparison on the first voice signal and a second voice signal, and generates a wake-up signal according to the first comparison. When receiving the wake-up signal, the CPU enters a working state from a sleeping state, performs a second comparison on the first voice signal and the second voice signal, and takes over the voice input from the sound receiver and the sound converter according to the second comparison.

10 Claims, 4 Drawing Sheets

Initial state 305
Receive a sound signal 310
Identify a voice signal 315
Compare the voice signals 320
Match? 325 No / Yes
Generate a wake-up signal 330
Receive the wake-up signal 335
Enter a working state 340
Compare the voice signals 345
Match? 350 No / Yes
Extracts a voice characteristic 355
Compare the voice characteristics 360
Match? 365 No / Yes
Take over voice input 370
No voice command is received within a predetermined time? 375 Yes / No

VOICE CONTROL DEVICE AND VOICE CONTROL METHOD

CROSS-REFERENCE TO RELATED APPLICATION

This application claims the priority benefit of China application serial no. 201210491178.1, filed on Nov. 27, 2012. The entirety of the above-mentioned patent application is hereby incorporated by reference herein and made a part of this specification.

BACKGROUND

1. Technical Field

The invention relates to a voice control device and a voice control method. Particularly, the invention relates to a method of waking up a voice control device by using a predetermined phrase.

2. Related Art

Presently, more and more electronic devices start to use voice control, and the voice control will become a commonly used user interface of most of the electronic devices.

However, regarding a mobile electronic device powered by batteries, energy consumption of a voice engine is rather high. To keep the voice engine of the system being always in a running state may quickly consume electric energy of the system. Therefore, the voice engine of the present mobile electronic device is generally triggered by using a button or a similar mechanism.

As the voice control is started by pressing a button, it is inconvenient for the user to use. If the voice engine is kept to be activated, it may cause unnecessary energy consumption.

SUMMARY

The invention is directed to a voice control device and a voice control method, by which a voice function is easily activated, and low power consumption is maintained in normal times, so as to resolve a contradiction of engine start and energy consumption.

The invention provides a voice control device including a sound receiver, a sound converter, a voice identifier, and a central processing unit (CPU). The sound receiver receives a first sound signal. The sound converter is coupled to the sound receiver and converts the first sound signal from analog signal to digital signal. The voice identifier is coupled to the sound converter, and identifies a first voice signal from the first sound signal, performs a first comparison on the first voice signal and a second voice signal, and generates a wake-up signal according to the first comparison. The CPU is coupled to the sound converter and the voice identifier, and when the CPU receives the wake-up signal, the CPU enters a working state from a sleeping state, performs a second comparison on the first voice signal and the second voice signal, and takes over a voice input from the sound receiver and the sound converter according to the second comparison.

In invention provides a voice control method, which is adapted to a voice control device, and the voice control method includes following steps. A first sound signal is received. A first voice signal is identified from the first sound signal. A first comparison on the first voice signal and a second voice signal is performed, and a wake-up signal is generated according to the first comparison. In response to the wake-up signal, a central processing unit of the voice control device enters a working state from a sleeping state, performs a second comparison on the first voice signal and the second voice signal, and takes over a voice input of the voice control device according to the second comparison.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1:
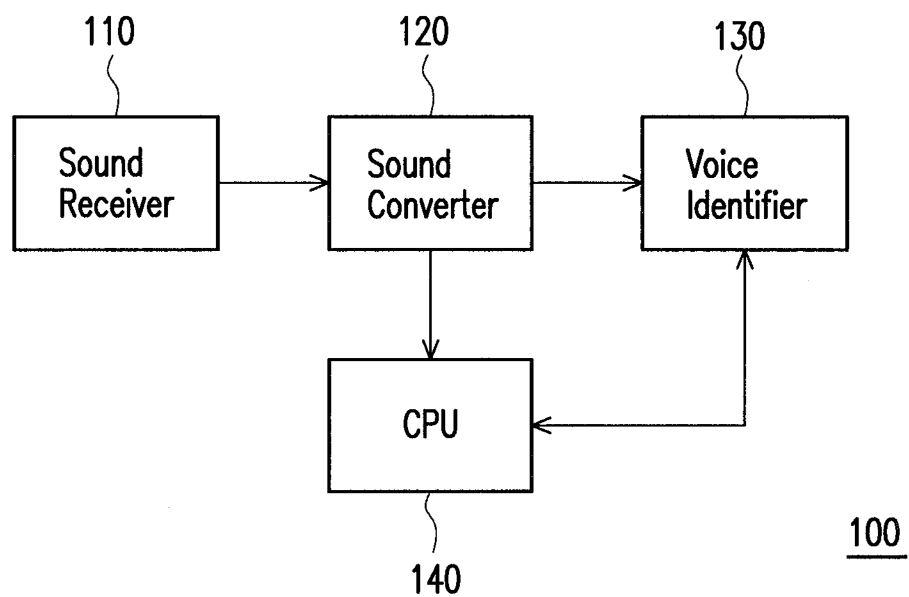
FIG. 1 is a schematic diagram of a voice control device according to an embodiment of the invention.

FIG. 1 is a schematic diagram of a voice control device 100 according to an embodiment of the invention. The voice control device 100 can be any mobile electronic device, for example, a mobile phone, a personal digital assistant, a tablet computer, a notebook computer, or any electronic device as a desktop computer, etc. that is capable of being controlled by voice. The voice control device 100 includes a sound receiver 110, a sound converter 120, a voice identifier 130, and a central processing unit (CPU) 140. The sound converter 120 is coupled to the sound receiver 110, the voice identifier 130 is coupled to the sound converter 120, and the CPU 140 is coupled to the sound converter 120 and the voice identifier 130.

The voice control device 100 of the present embodiment can activate a voice control function thereof through a predetermined voice. In brief, the sound receiver 110 captures all sounds of the ambient environment including a sound sent by the user, and outputs captured sound signals. The sound receiver 110 can be a microphone or a similar sound receiving device. The sound converter 120 converts the sound signal from analog signal to digital signal. The voice identifier 130 and the CPU 140 compare the sound signal with another predetermined sound signal to determine whether or not to activate the voice control function of the voice control device 100.

Figure 2A:
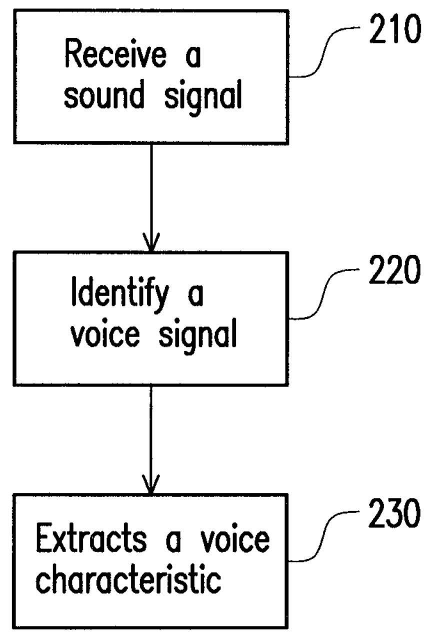
FIG. 2A is a flowchart illustrating a voice control method according to an embodiment of the invention.
Figure 2B:
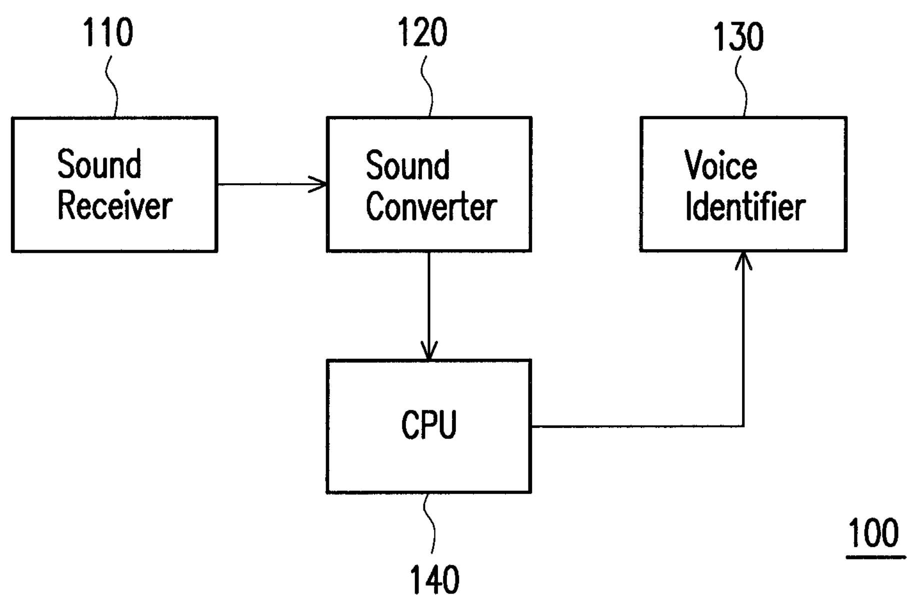
FIG. 2B is a diagram illustrating a signal transmission flow of the voice control device of FIG. 1 corresponding to the method flow of FIG. 2A.

FIG. 2A is a flowchart illustrating a voice control method according to an embodiment of the invention, which relates to setting of a predetermined voice used for activating the voice control device 100, and the method is adapted to be executed by the voice control device 100. FIG. 2B is a diagram illustrating a signal transmission flow of the voice control device 100 corresponding to the method flow of FIG. 2A.

The predetermined voice is generally a short word or a phrase, for example, a short watchword or password. Alternatively, the voice control device 100 can be named, and the name of the voice control device 100 can serve as the aforementioned predetermined voice. After the user tells the predetermined voice, in step 210, the sound receiver receives a sound signal. The sound converter 120 converts the sound signal from analog signal to digital signal. The sound converter 120 can also amplify the sound signal, where the sound signal includes a voice of the user and noise of the ambient environment. In step 220, the CPU 140 identifies the predetermined voice signal (which is referred to as VSD hereinafter) of the user from the sound signal. Then, in step 230, the CPU 140 extracts a predetermined voice characteristic (which is referred to as VCD hereinafter) from the predetermined voice signal VSD. The CPU 140 can store the predetermined voice signal VSD and the predetermined voice characteristic VCD. The CPU 140 can also transmit the predetermined voice signal VSD to the voice identifier 130 for storage. The predetermined voice signal VSD is the predetermined voice used to activate the voice control device 100.

Figure 3A:
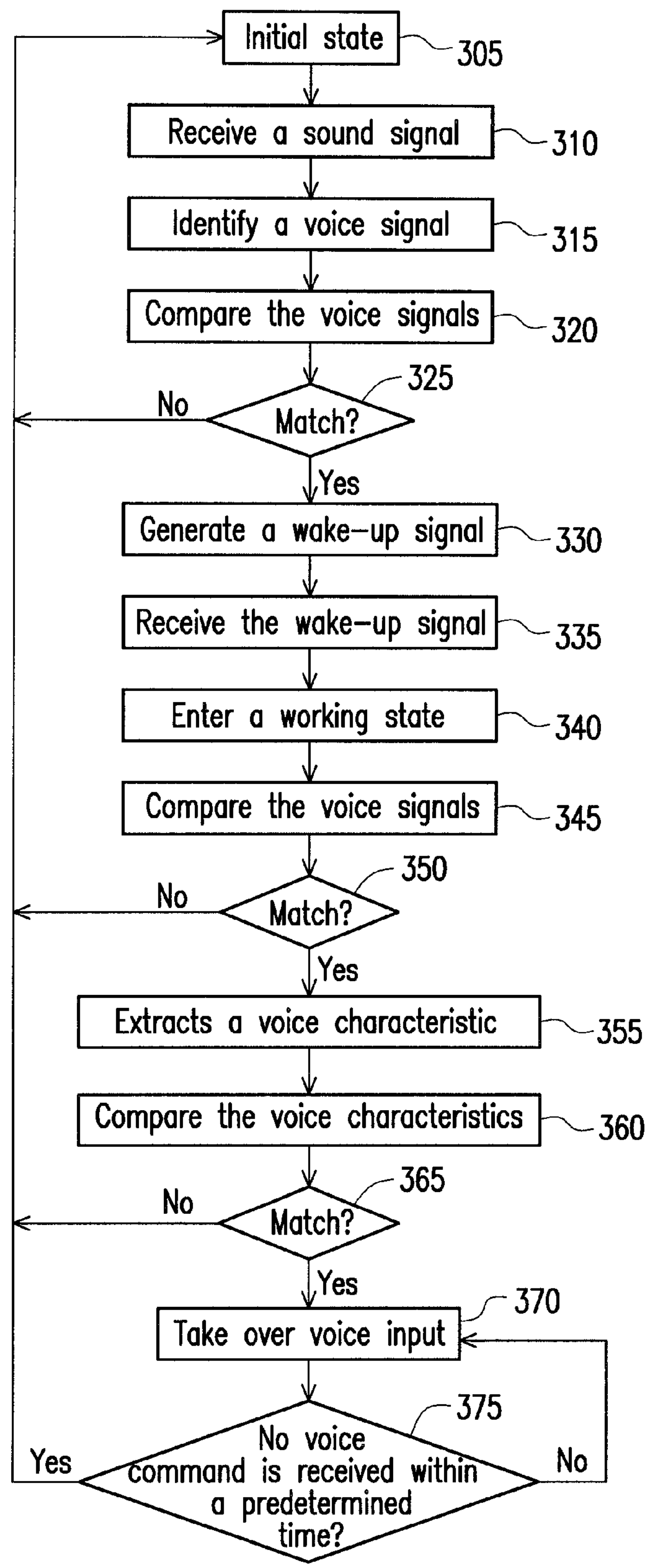
FIG. 3A is a flowchart illustrating a voice control method according to an embodiment of the invention.
Figure 3B:
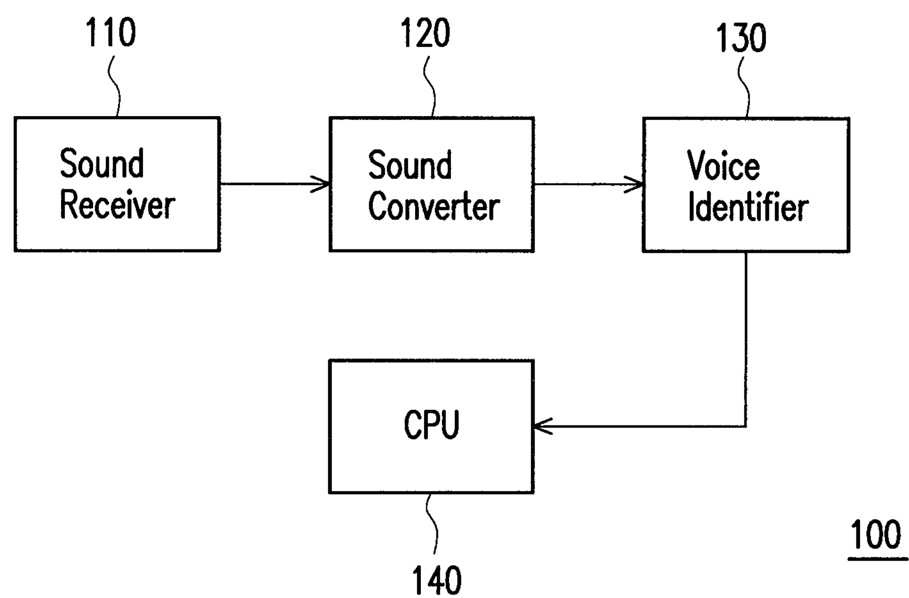
FIG. 3B is a diagram illustrating a signal transmission flow of the voice control device of FIG. 1 corresponding to the method flow of FIG. 3A.

FIG. 3A is a flowchart illustrating a voice control method according to an embodiment of the invention, which relates comparison of the aforementioned predetermined voice, and the method is adapted to be executed by the voice control device 100. FIG. 3B is a diagram illustrating a signal transmission flow of the voice control device 100 corresponding to the method flow of FIG. 3A.

First, in step 305, the voice control device 100 is in an initial state, i.e. the CPU 140 is in a sleeping state, and does not handle a voice input, while the voice identifier 130 in a working state handles the voice input. The CPU 140 has the working state and the sleeping state, and the voice identifier 130 also has the working state and the sleeping state. The working state refers to a normal working state, which has normal energy consumption. The sleeping state refers to a state of non-working and waiting to be woken up, which has very low power consumption.

Then, in step 310, the sound receiver 110 receives a sound signal, and the sound converter 120 converts the sound signal from analog signal to digital signal. The sound converter 120 can also amplify the sound signal, where the sound signal includes a voice of the user and noise of the ambient environment. In step 315, the voice identifier 130 identifies an input voice signal (which is referred to as VSI hereinafter) of the user from the sound signal.

Then, in step 320, the voice identifier 130 performs a first comparison on the input voice signal VSI and the predetermined voice signal VSD, and in step 325, the voice identifier 130 determines whether the two voice signals match. If the input voice signal VSI does not match the predetermined voiced signal VSD, the flow returns to the step 305. If the input voice signal VSI matches the predetermined voiced signal VSD, in step 330, the voice identifier 130 generates a wake-up signal to wake up the CPU 140.

In step 335, the CPU 140 receives the wake-up signal, and in step 340, the CPU 140 enters the working state from the sleeping state. The CPU 140 receives the input voice signal VSI from the voice identifier 130, and in steps 345 to 365, the CPU 104 performs a second comparison on the input voice signal VSI and the predetermined voice signal VSD. In the step 345, the CPU 140 compares the input voice signal VSI and the predetermined voice signal VSD, and in the step 350, the CPU 140 determines whether the two voice signals match. If the input voice signal VSI does not match the predetermined voiced signal VSD, the CPU 140 re-enters the sleeping state, and the flow returns to the step 305. If the input voice signal VSI matches the predetermined voiced signal VSD, in step 355, the CPU 140 extracts an input voice characteristic (which is referred to as VCI hereinafter) from the input voice signal VSI, and in step S360, the CPU 140 compares the input voice characteristic VCI and the predetermined voice characteristic VCD, and in step 365, the CPU 140 determines whether the two voice characteristics match. If the input voice characteristic VCI does not match the predetermined voiced characteristic VCD, the CPU 140 re-enters the sleeping state, and the flow returns to the step 305. If the input voice characteristic VCI matches the predetermined voiced characteristic VCD, in step 370, the CPU 140 takes over the voice input of the voice control device 100, i.e. the voice input from the sound receiver 110 and the sound converter 120. Now, the voice identifier 130 enters the sleeping state from the working state.

The CPU 140 executes a voice engine of the voice control device 100, so that the step 370 is to activate the voice engine and the voice control function of the voice control device 100.

Then, in step 375, the CPU 140 checks whether the CPU 140 does not identify any voice signal from the voice input within a predetermined time after the CPU 140 enters the working state. If the CPU 140 identifies the voice signal within the predetermined time, the flow returns to the step 370, and if the CPU 140 does not identify any voice signal within the predetermined time, it represents that the user does not send any voice command within the predetermined time, and the CPU 140 re-enters the sleeping state, while the voice identifier 130 re-enters the working state, and the flow returns to the step 305.

In the present embodiment, the voice identifier 130 and the CPU 140 respectively perform comparison on the input voice signal VSI and the predetermined voice signal VSD. Since the voice identifier 130 is a low cost circuit with super low power consumption, an error identification rate of the comparison thereof is higher than that of the CPU 140. The sound receiver 110 has to continuously receive the sound signals, and the voice identifier 130 has to identify the voice of the user from the continuous sound signals, which further increases the error identification rate of the voice identifier 130. Therefore, in the present embodiment, after the initial comparison of the voice identifier 130, the CPU 140 again confirms the comparison. The CPU 140 has higher computation capability, which can compare the input voice signal VSI and the predetermined voice signal VSD by using a more accurate algorithm, so as to decrease the error identification rate.

In the present embodiment, comparison of the voice signals is used to confirm that the user speaks the correct predetermined voice, and comparison of the voice characteristics is used to confirm the users' identity since the voice characteristic of each person is different. By comparing the voice characteristics, only the specific user can activate the voice engine of the voice control device 100, and if the user's identify is unnecessary to be limited, the step 230 of FIG. 2A and the steps 355 to 365 of FIG. 3A are omitted. In this case, if the result of the step 350 is affirmative, the flow directly enters the step 370.

The voice identifier 130 is a simplified voice identification engine with a low power consumption, which is specifically used to identify a predetermined short voice, and when the predetermined voice is identified, the voice identifier 130 activates the CPU 140 to execute a formal voice engine. The voice identifier 130 is only required to perform a pronunciation match of a single short voice without using an acoustic dictionary and a language model, such that a scale and power consumption thereof is far less than that of a normal voice identification engine. In this way, not only very low stand-by power consumption is achieved, but also the user can directly active the voice control through voice, such that the voice control device is easier to use and is more convenient. Therefore, a contradiction of voice engine start and energy consumption is resolved.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A voice control device, comprising:

a sound receiver, receiving a first sound signal;

a sound converter, coupled to the sound receiver, and converting the first sound signal from analog signal to digital signal;

a voice identifier, coupled to the sound converter, and identifying a first voice signal from the first sound signal, performing a first comparison on the first voice signal and a second voice signal, and generating a wake-up signal in response to the first voice signal matching the second voice signal in the first comparison; and a central processing unit (CPU), coupled to the sound converter and the voice identifier, wherein when the CPU receives the wake-up signal, the CPU enters a first working state from a first sleeping state, receives the first voice signal from the voice identifier, and performs a second comparison on the first voice signal and the second voice signal, wherein when the first voice signal matches the second voice signal in the second comparison, the CPU takes over a voice input from the sound receiver and the sound converter, and when the first voice signal does not match the second voice signal in the second comparison, the CPU re-enters the first sleeping state.

2. The voice control device as claimed in claim 1, wherein the sound receiver receives a second sound signal, the sound converter converts the second sound signal from analog signal to digital signal, and the CPU identifies the second voice signal from the second sound signal and transmits the second voice signal to the voice identifier.

3. The voice control device as claimed in claim 2, wherein the sound converter amplifies the first sound signal and the second sound signal.

4. The voice control device as claimed in claim 2, wherein the CPU extracts a second voice characteristic from the second voice signal, and when the CPU performs the second comparison and the first voice signal matches the second voice signal, the CPU extracts a first voice characteristic from the first voice signal and compares the first voice characteristic with the second voice characteristic; when the first voice signal matches the second voice signal and the first voice characteristic matches the second voice characteristic, the CPU takes over the voice input; and when the first voice signal does not match the second voice signal or the first voice characteristic does not match the second voice characteristic, the CPU re-enters the first sleeping state.

5. The voice control device as claimed in claim 1, wherein when the CPU takes over the voice input, the voice identifier enters a second sleeping state from a second working state.

6. The voice control device as claimed in claim 5, wherein when the CPU does not identify any voice signal from the voice input within a predetermined time after the CPU enters the first working state, the CPU re-enters the first sleeping state, and the voice identifier re-enters the second working state.

7. A voice control method, adapted to a voice control device, and comprising:

receiving a first sound signal;

identifying a first voice signal from the first sound signal;

performing a first comparison on the first voice signal and a second voice signal, and generating a wake-up signal in response to the first voice signal matching the second voice signal in the first comparison; and in response to the wake-up signal, a central processing unit (CPU) of the voice control device entering a working state from a sleeping state, and performing a second comparison on the first voice signal and the second voice signal;

the CPU taking over the voice input when the first voice signal matches the second voice signal in the second comparison; and the CPU re-entering the sleeping state when the first voice signal does not match the second voice signal in the second comparison.

8. The voice control method as claimed in claim 7, further comprising:

receiving a second sound signal; and identifying the second voice signal from the second sound signal.

9. The voice control method as claimed in claim 8, further comprising:

extracting a second voice characteristic from the second voice signal, and the step of performing the second comparison further comprises:

extracting a first voice characteristic from the first voice signal and comparing the first voice characteristic with the second voice characteristic when the first voice signal matches the second voice signal;

the CPU taking over the voice input when the first voice signal matches the second voice signal and the first voice characteristic matches the second voice characteristic; and the CPU re-entering the sleeping state when the first voice signal does not match the second voice signal or the first voice characteristic does not match the second voice characteristic.

10. The voice control method as claimed in claim 7, further comprising:

the CPU re-entering the sleeping state when the CPU does not identify any voice signal from the voice input within a predetermined time after the CPU enters the working state.

* * * * *